United States Patent
Osuga et al.

(10) Patent No.: US 6,659,209 B2
(45) Date of Patent: Dec. 9, 2003

(54) TRACTOR

(75) Inventors: Masashi Osuga, Nara-ken (JP); Takashi Yoshii, Sakai (JP); Hiroshi Shimada, Ssakai (JP)

(73) Assignee: Kubota Corporation, Osaka (JP)

( * ) Notice: Subject to any disclaimer, the term of this patent is extended or adjusted under 35 U.S.C. 154(b) by 0 days.

(21) Appl. No.: 10/255,735

(22) Filed: Sep. 25, 2002

(65) Prior Publication Data

US 2003/0019673 A1 Jan. 30, 2003

Related U.S. Application Data

(60) Continuation of application No. 09/976,774, filed on Oct. 12, 2001, now Pat. No. 6,460,886, which is a division of application No. 09/196,053, filed on Nov. 19, 1998, now Pat. No. 6,318,485.

(30) Foreign Application Priority Data

May 26, 1998 (JP) ............................................. 10-143827

(51) Int. Cl.[7] ........................... B60K 17/00; B60K 17/28
(52) U.S. Cl. ............... 180/53.8; 180/53.1; 180/312; 180/378; 180/374; 74/15.2; 74/15.4; 74/606 R
(58) Field of Search .................. 180/311, 312, 180/291, 292, 293, 377, 378, 305, 306, 307, 374, 375, 53.1, 53.8, 242; 74/11, 15.2, 15.4, 665 F, 665 G, 665 H, 665 T, 606 R

(56) References Cited

U.S. PATENT DOCUMENTS

| | | | |
|---|---|---|---|
| 3,873,222 A | 3/1975 | Babbit, Jr. et al. | |
| 4,513,834 A | * 4/1985 | Hayashi et al. | 180/370 |
| 4,579,183 A | * 4/1986 | Irikura et al. | 180/53.1 |
| 4,691,802 A | * 9/1987 | Ishimori et al. | 180/291 |
| 4,781,260 A | 11/1988 | Morita et al. | |
| 4,880,070 A | * 11/1989 | Irikura | 180/53.1 |
| 5,142,940 A | * 9/1992 | Hasegawa | 74/606 R |
| 5,277,270 A | 1/1994 | Hasegawa | |
| RE34,833 E | * 1/1995 | Hasegawa et al. | 180/53.1 |
| 5,564,518 A | * 10/1996 | Ishii et al. | 180/242 |
| 5,823,285 A | * 10/1998 | Tsuchihashi et al. | 180/242 |
| 5,947,218 A | * 9/1999 | Ishimaru | 180/53.1 |
| 6,318,485 B1 | 11/2001 | Osuga et al. | |

FOREIGN PATENT DOCUMENTS

| | | |
|---|---|---|
| JP | 58-20569 | 2/1983 |
| JP | 7-186852 | 7/1995 |
| JP | 7-232567 | 9/1995 |
| JP | 8-238999 | 9/1996 |
| JP | 8-282312 | 10/1996 |
| JP | 9-30350 | 2/1997 |
| JP | 9-240402 | 9/1997 |

* cited by examiner

*Primary Examiner*—Paul N. Dickson
*Assistant Examiner*—Ruth Ilan
(74) *Attorney, Agent, or Firm*—Webb Ziesenheim Logsdon Orkin & Hanson, P.C.

(57) ABSTRACT

A tractor having a mid-mount type mower includes a pair of frames extending in a fore and aft direction, and a transmission case extending and supported between the pair of frames. The transmission case houses a power take off clutch disposed above a rear wheel differential. A change speed gearing mechanism is disposed between a front surface of the transmission case and the rear wheel differential. With such an arrangement of the components, the transmission case has a reduced length in the fore and aft direction.

15 Claims, 9 Drawing Sheets

TRACTOR

This application is a continuation of currently U.S. patent application Ser. No. 09/976,774, filed Oct. 12, 2001 now U.S. Pat. No. 6,460,886, which is a divisional application of U.S. patent application Ser. No. 09/196,053, filed Nov. 19, 1998, which issued on Nov. 20, 2001 as U.S. Pat. No. 6,318,485.

BACKGROUND OF THE INVENTION

1. Field of the Invention

This invention relates to tractors and, more particularly, to a transmission apparatus of a tractor having a mid-mount type lawn mower.

2. Description of the Related Art

Examples of tractors having a mid-PTO shaft for allowing a mower to be disposed under a tractor body between front and rear wheels are disclosed in Japanese Patent Laying-Open Publication H8-282312 and Patent Laying-Open Publication H7-232567. In these tractors, an engine mounted on a front portion of the tractor body and a transmission disposed in a rearward position of the tractor body are interlocked through a drive shaft. Such a construction secures a space for accommodating the mower. That is, a sufficient space is secured for vertically movably accommodating the mower by arranging the engine and transmission in forward and rearward positions of the tractor body. The mower may be raised to a sufficient height above the ground when the tractor makes a non-operational run.

The size of a tractor is determined largely by the wheelbase which is the distance between front and rear wheels. Tractors of small overall size are desired particularly for use on small farms and for personal use. It is thus desirable to reduce the wheelbase to realize a small tractor capable of accommodating a working implement such as a mower in an intermediate position thereof.

However, when the wheelbase is reduced, it is difficult to secure a sufficient space for a working implement such as a mower since the transmission of the tractor occupies a large space.

An object of this invention is to provide a small tractor, which secures a sufficient space for a mower.

SUMMARY OF THE INVENTION

The above object is fulfilled, according to this invention, by a tractor comprising a pair of frames extending in a fore and aft direction of the tractor and spaced from each other transversely thereof, an engine disposed in a forward region of the pair of frames, a transmission case extending and supported between rear portion of the pair of frames, a rear wheel differential housed in the transmission case, a pair of rear wheel axles connected to a pair of rear wheels of the tractor and having an axis extending transversely of the rear wheel differential, a power take-off clutch disposed above the rear wheel differential, and a change speed gearing mechanism disposed between the front surface of the transmission case and a virtual plane extending vertically through the axis.

In the above construction, the rear wheel differential and the PTO clutch are arranged vertically. The change speed gear mechanism has a flat configuration thin in the fore and aft direction, which is disposed between the front surface of the transmission case and a virtual plane extending vertically through the axis of the rear wheel axles. This construction provides a reduced fore and aft length between the front surface of the transmission case and the rear wheel axles, compared with a construction in which the PTO clutch is disposed forwardly of the differential or the change speed gear mechanism is disposed forwardly of the differential.

Thus, the tractor according to this invention realizes a reduced wheelbase without reducing the diameters of front and rear wheels or the fore and aft length of a working implement. The above construction enables the tractor to be built compact while securing a sufficient space for the working implement disposed in the lower position thereof.

In an embodiment of this invention, the front cover of the transmission case, preferably, has an oil filter disposed on a lower portion thereof, and supply and drain oil passages which are through holes formed in the front cover to extend parallel to the front surface. With this construction, the required supply and drain oil passages may have a reduced length or no length to achieve a reduction in weight. Such oil passages are less vulnerable to damage through contact with other objects than where supply and drain oil passages are in the form of pipes, hoses or the like arranged along an outer surface of the transmission case.

In a further embodiment of this invention, the tractor includes front wheels, rear wheels, a transmission case, a rear axle, and a framework. The transmission case is disposed adjacent to the rear wheels. The transmission case has right and left walls, a front wall, and a rear wall. The rear axle is supported by the transmission case. The framework substantially forms a body of the tractor and extends in a fore and aft direction of the tractor. The framework includes a first frame and a second frame. The first frame has its rearward end region connected to the left wall of the transmission case. The second frame has its rearward end region connected to the right wall of the transmission case. The tractor further includes a rollover protection structure (ROPS) supported by the framework.

The ROPS may include-right and left legs extending upwardly, and a cross portion connecting the right and left legs. The left leg may be supported by the first frame through a left post, and the right may be supported by the second frame through a right post. The right and left connecting regions between the framework and the transmission case may be located adjacent to right and left connecting regions between the framework and the respective right and left posts, respectively. The tractor may further include horizontal right and left mounting seats that are provided at one side of the respective right and left posts. The mounting seats may have the right and left legs of the ROPS connected thereto, respectively. The mounting seats and the right and left legs of the ROPS may be connected to each other with right and left fenders interposed therebetween, respectively.

Other features and advantages of this invention will be apparent from the following description of the preferred embodiment to be taken with reference to the drawings.

DETAILED DESCRIPTION OF THE PREFERRED EMBODIMENT

An embodiment of this invention will be described hereinafter with reference to the drawings.

Figure 1:
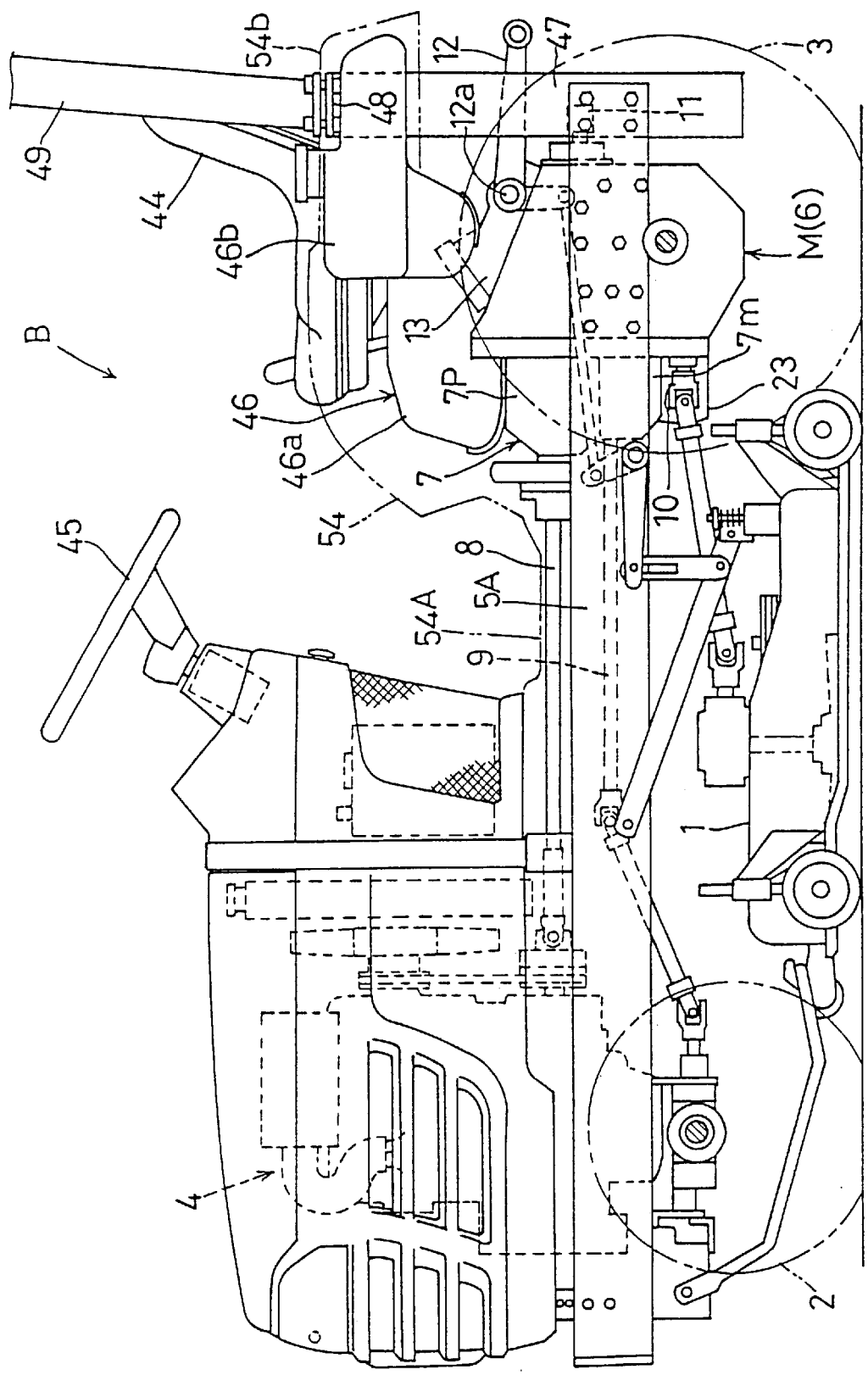
FIG. 1 is a side elevation of a mid-mount type riding lawn tractor according to this invention.
Figure 2:
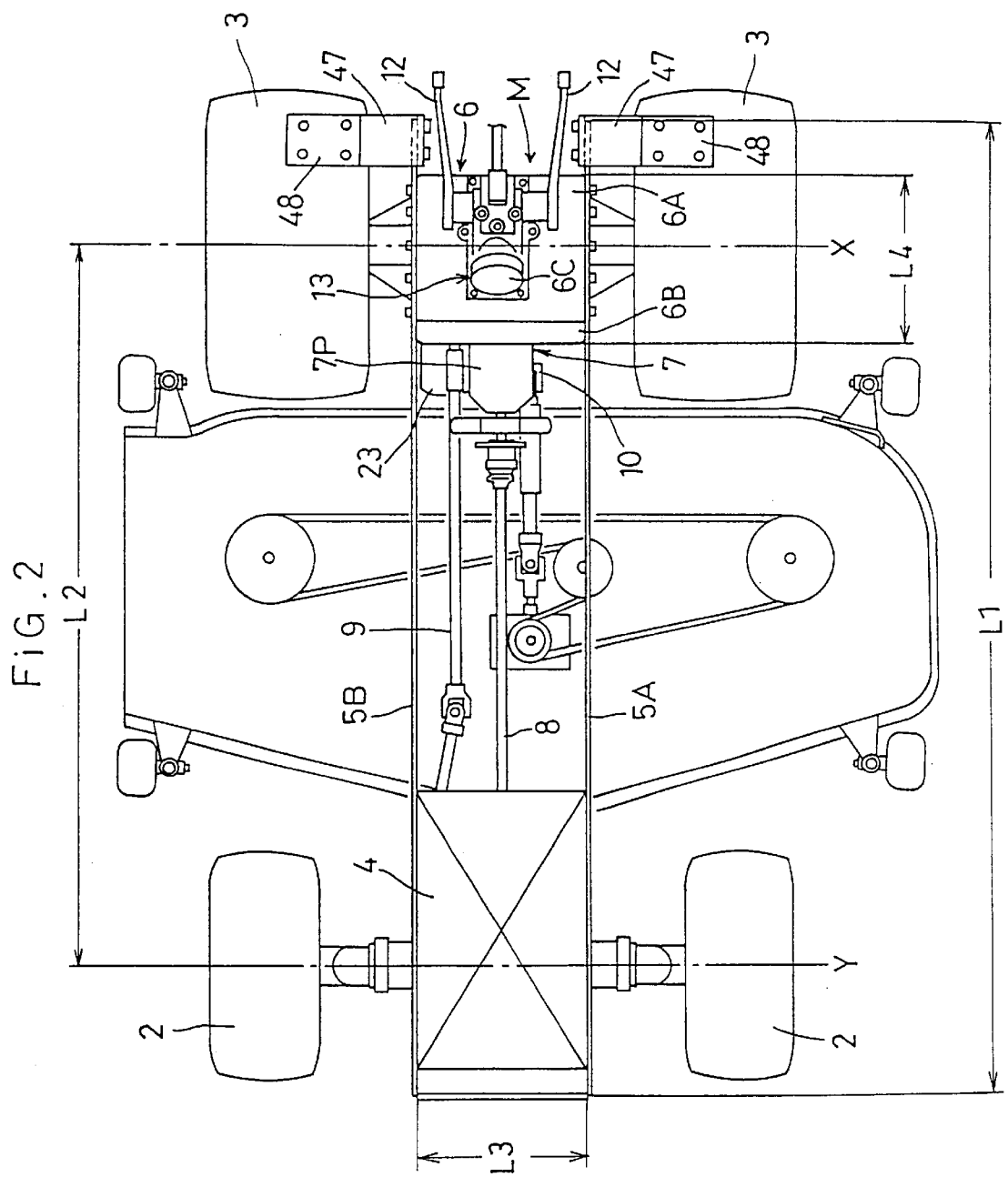
FIG. 2 is a plan view of the lawn tractor showing an arrangement of a transmission system.

FIGS. 1 and 2 show a mid-mount type riding lawn tractor, which is one example of tractors according to this invention. The lawn tractor has a mower 1 mounted under a tractor body between front wheels 2 and rear wheels 3.

In this specification, the terms forward and rearward or fore and aft are used with reference to the fore and aft direction of the tractor.

The lawn tractor includes a pair of right and left body frames 5A and 5B extending in the fore and aft direction. An engine 4 is disposed in a forward position of the tractor body, and a transmission M disposed in a rearward position, both arranged between the pair of right and left body frames 5A and 5B. An HST 7 is rigidly attached to the front of a transmission case 6, and is connected to the engine 4 by a drive shaft 8. A front wheel drive shaft 9 and a mid-PTO shaft 10 extend forward from the transmission M for driving the front wheels 2 and the mower 1, respectively. Further, a rear PTO shaft 11 projects rearward from the transmission M for driving a rear working implement not shown. The transmission case 6 has a hydraulic cylinder 13 formed integral with an upper surface thereof for raising and lowering the rear working implement, and supports an axis 12a of lift arms 12. The body frames 5 are formed as plates having vertically elongated sections, and the transmission case 6 is bolted to inward surfaces thereof.

In FIG. 2, reference L1 denotes a length in the fore and aft direction of the body frames 5A and 5B. Reference L2 denotes a distance in plan view between a rotational axis Y of front wheels 2 and a rotational axis X of rear wheels 3. Reference L3 denotes a right and left distance between the body frames 5A and 5B, i.e., a right and left width of the transmission case 6. Reference L4 denotes a fore and aft width of the transmission case 6.

The dimensions L1–L4, desirably, are in the following relationship. L4 is ¼ or less of L1, and preferably ⅕ or less of L1. Further, L4 is ⅓.₅ or less of L2 and preferably ¼ or less of L2. In addition, L4 is 1.2 times L3 or less. This is, the transmission case 6 has a reduced fore and aft length between the forward end of a front cover 6B thereof and the rear axles 20. For this purpose, the transmission case 6 has components arranged therein as described hereinafter.

Figure 3:
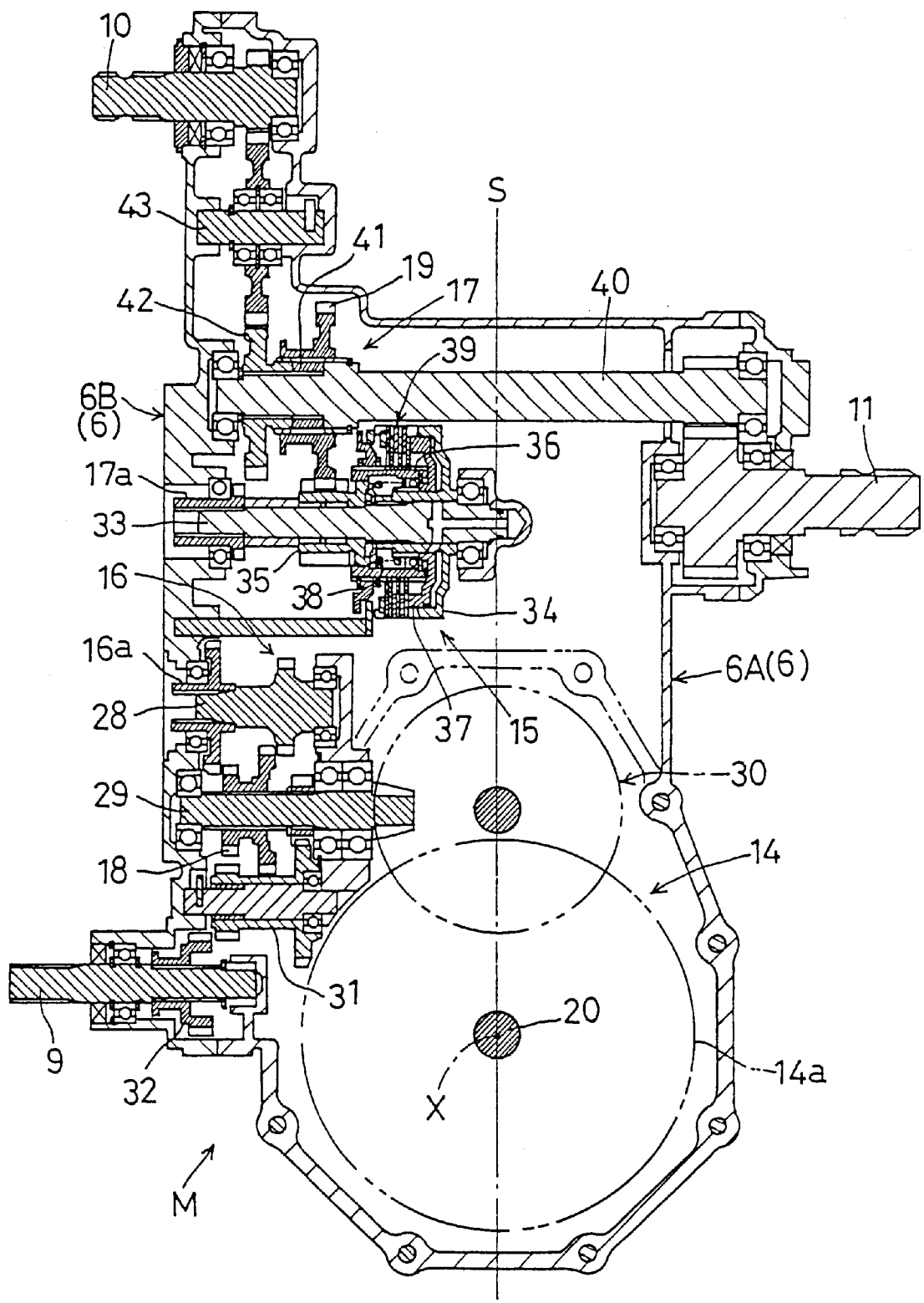
FIG. 3 is a sectional view of a transmission taken along section line 3—3 in FIG. 5.
Figure 4:
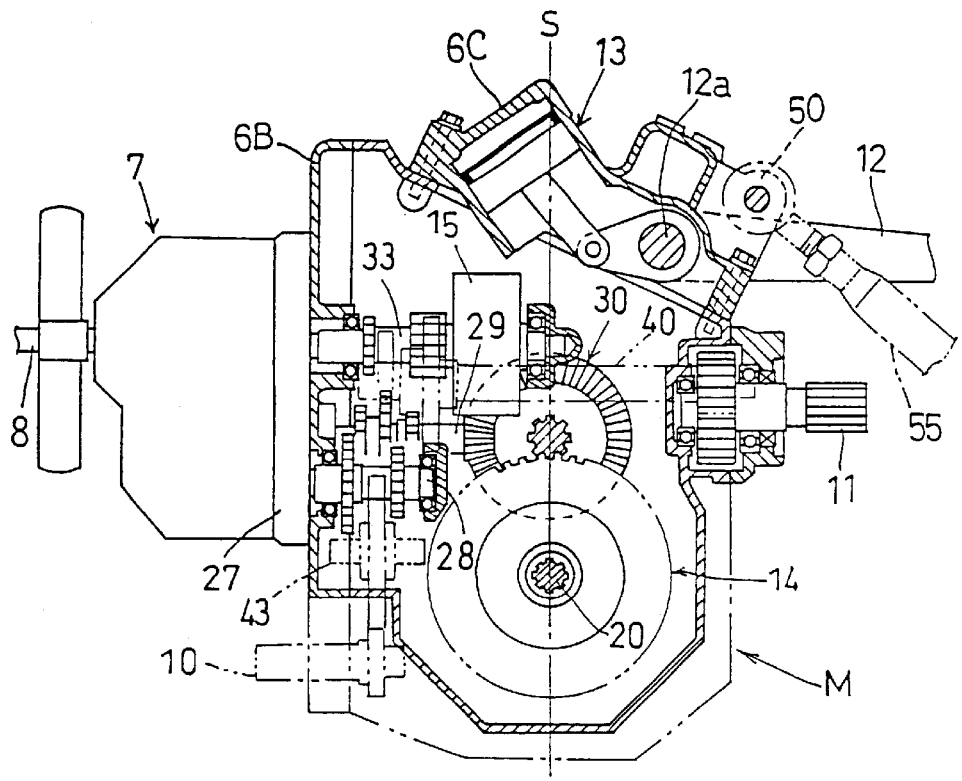
FIG. 4 is a sectional side view showing a principal portion of the transmission.
Figure 5:
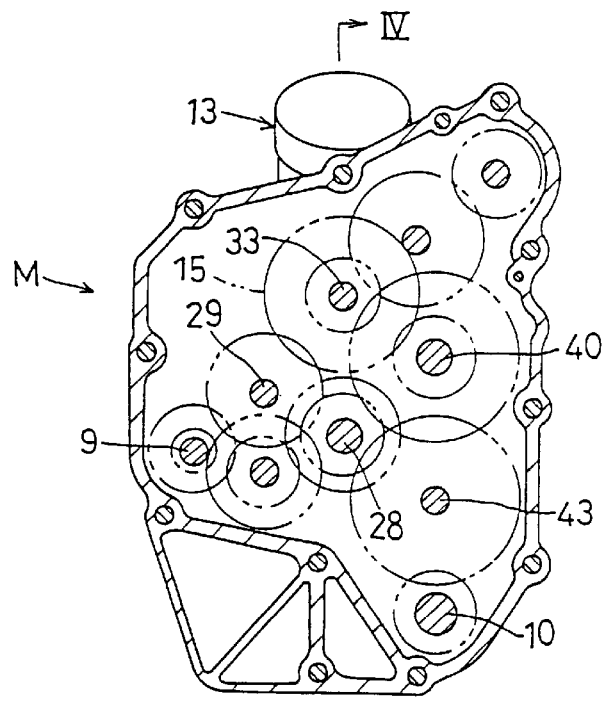
FIG. 5 is a front view showing an arrangement of shafts in the transmission.
Figure 6:
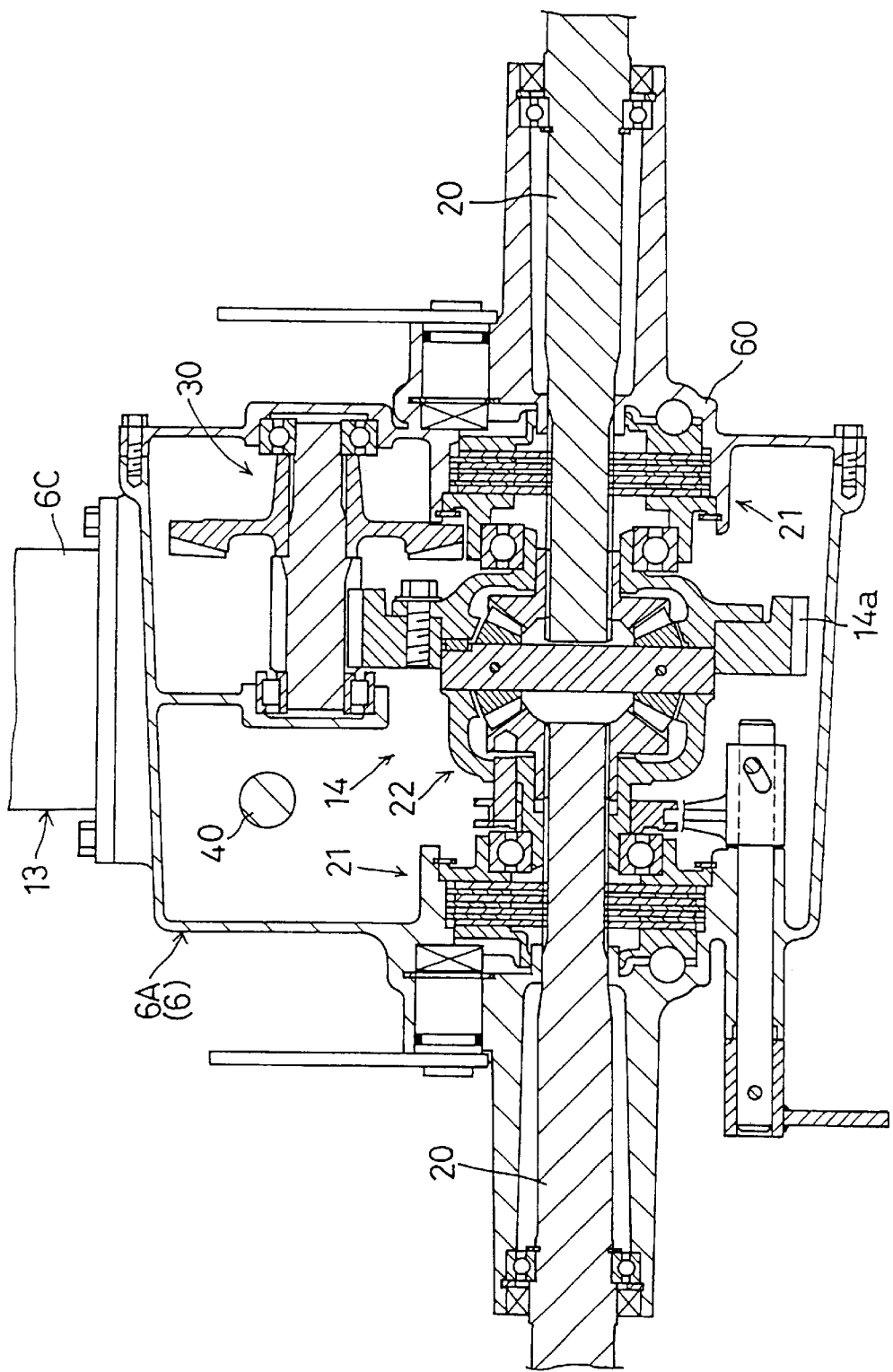
FIG. 6 is a sectional rear view of a differential and adjacent components.

FIG. 3 is an expanded view illustrating an interlocking relationship among gears and the like mounted in the transmission case 6. FIGS. 4 and 5 show an actual positional relationship of several shafts shown in FIG. 3.

In FIG. 3, the left side always corresponds to the forward traveling direction of the lawn tractor. Reference S in FIG. 3 denotes a virtual plane extending vertically through the axis X of rear wheel axles 20. As shown in FIGS. 3 through 5, the transmission M includes a rear wheel differential 14, a PTO clutch 15 disposed above the differential 14, a propelling drive auxiliary change speed mechanism 16 disposed in a small flat space forwardly of the differential 14 and PTO clutch 15, and a PTO change speed mechanism 17. The auxiliary change speed mechanism 16 and PTO change speed mechanism 17 are arranged forwardly of the virtual plane S.

The auxiliary change speed mechanism 16 receives power having undergone a change speed operation of a motor 7m in HST 7. The PTO change speed mechanism 17 receives power of a pump 7p without change speed.

The auxiliary change speed mechanism 16 includes a propelling drive input shaft 28 for receiving power from HST 7 through a gear coupling 16a, a propelling drive change speed shaft 29, and a shift gear 18 mounted on the change speed shaft 29 to be rotatable relative to the change speed shaft 29 and engageable with the propelling drive input shaft 28. The shift gear 18 is moveable to switch the auxiliary change speed mechanism 16 among high-speed, neutral and low-speed positions. The propelling drive change speed shaft 29 is interlocked to the differential 14 through a bevel gear reduction mechanism 30.

The change speed shaft 29 is interlocked through gearing to an intermediate shaft 31 which is interlocked to the front wheel drive shaft 9 through a clutch gear 32. The clutch gear 32 is shiftable between a front wheel drive position and a front wheel non-drive position.

As seen from FIG. 3, the change speed shaft 29 and intermediate shaft 31 are arranged as close in the fore and aft direction to a large-diameter gear 14a of differential 14 as possible. Thus, the space for accommodating the auxiliary change speed mechanism 16 and the front wheel drive gearing has a minimal fore and aft length.

The PTO clutch 15 is in the form of a wet, multi-plate friction clutch mounted on a PTO input shaft 33 for receiving pump power from HST 7 through a coupling 17a. The PTO clutch 15 includes an outer clutch body 34 mounted on the PTO input shaft 33 to be rotatable therewith, an inner clutch body 35 mounted on the PTO input shaft 33 to be rotatable relative thereto, a support ring 36 mounted on the inner clutch body 35 to be slidable relative thereto and rotatable therewith, a clutch piston 37, a return spring 38 and friction plates 39. The PTO clutch 15 is engaged when pressure oil is supplied to move the piston 37 against the force of return spring 38 to place the friction plates 39 in pressure contact, and is disengaged by stopping the pressure oil supply.

The PTO change speed mechanism 17 includes a relay shaft 40 interlocked to a rear PTO shaft 11 through gearing, a collar 41 mounted on the relay shaft 40 to be rotatable relative thereto, a selector gear 19 mounted on the collar 41 to be rotatable together and meshed with the inner clutch body 35, a PTO drive gear 42 mounted on the relay shaft 40 to be rotatable relative thereto, and an interlocking shaft 43 for interlocking the PTO drive gear 42 to the mid-PTO shaft 10. The selector gear 19 is axially moveable through a spline engagement.

The selector gear 19 is shiftable among three positions, i.e., a first position for engaging the collar 41 and PTO drive gear 42 to drive only the mid-PTO shaft 10, a second position for engaging the collar 41 and relay shaft 40 to drive only the rear PTO shaft 11, and a third position for engaging the collar 41, PTO drive gear 42 and relay shaft 40 to drive both PTO shafts 10 and 11.

The PTO change speed mechanism 17 is mounted in a space having a reduced fore and aft length which is achieved by disposing the PTO clutch 15 rearwardly and directly over the bevel gear reduction mechanism 30, and the selector gear 19 on the relay shaft 40. Consequently, the propelling and PTO change speed gear mechanisms 16 and 17 require a reduced fore and aft length, whereby the transmission case 6 has a reduced fore and aft length between the forward end of a front cover 6B thereof and the rear axles 20. The distance between the axis X of said rear wheels 3 and the forward end of the front cover 6B in plan view is preferably less than 1/8 or, more preferably less than 1/10 of, a length of the body frames 5A and 5B.

Figure 7:
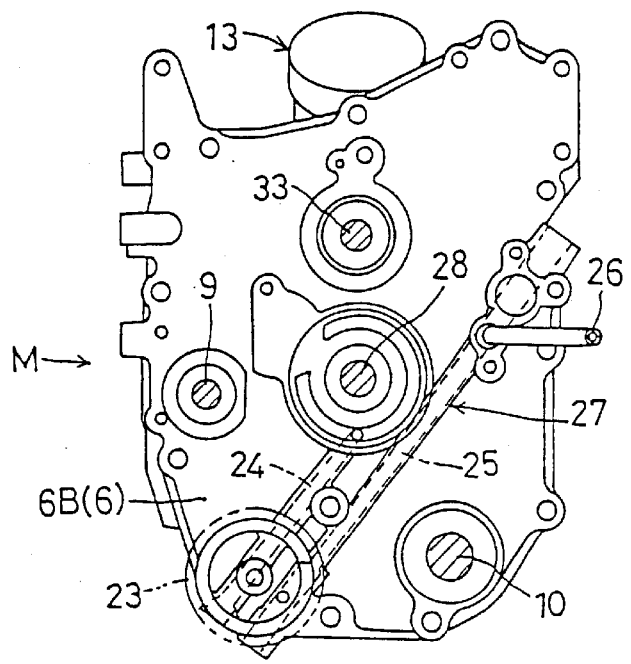
FIG. 7 is a front view of a front cover showing supply and drain oil passages for an oil filter.

The transmission case 6 includes a main case 6A surrounding the auxiliary change speed mechanism 16, PTO change speed mechanism 17, differential 14 and PTO clutch 15, the front cover 6B acting as a front lid for the two change speed mechanisms 16 and 17, and a top cover 6C. The main case 6A is formed as an integral component. The main case 6A houses a pair of side brakes 21 for acting on the right and left rear axles 20, and a differential lock mechanism 22. As shown in FIG. 7, the front cover 6B has an oil filter 23 protruding forward from a lower position on the front surface thereof. Supply and drain oil passages 24 and 25 communicating with the oil filter 23 are formed in the front surface of front cover 6B.

Specifically, the supply and drain oil passages 24 and 25 are in the form of through holes formed in a vertical thick wall portion of the front surface and extending parallel to the surface. The supply and drain oil passages 24 and 25 extend obliquely from upper left to lower right positions with respect to the forward traveling direction of the tractor. One supply and drain oil passage 24 communicates with the interior of transmission case 6 where a shaft of motor 7m of HST 7 is received. The other supply and drain oil passage 25 departs from the upper left position of front cover 6B to communicate with a metal pipe 26 extending to a hydraulic device such as a power steering unit.

The top cover 6C supports the lift arm axis 12a, and defines a piston chamber 13a of hydraulic lift cylinder 13. The top cover 6C is bolted to the upper surface of main case 6A through surfaces w inclined rearwardly. The upper surface of top cover 6C is shaped to define the piston chamber 13a, and pivotal seats 50 of top links of a three-point link mechanism not shown.

Figure 8:
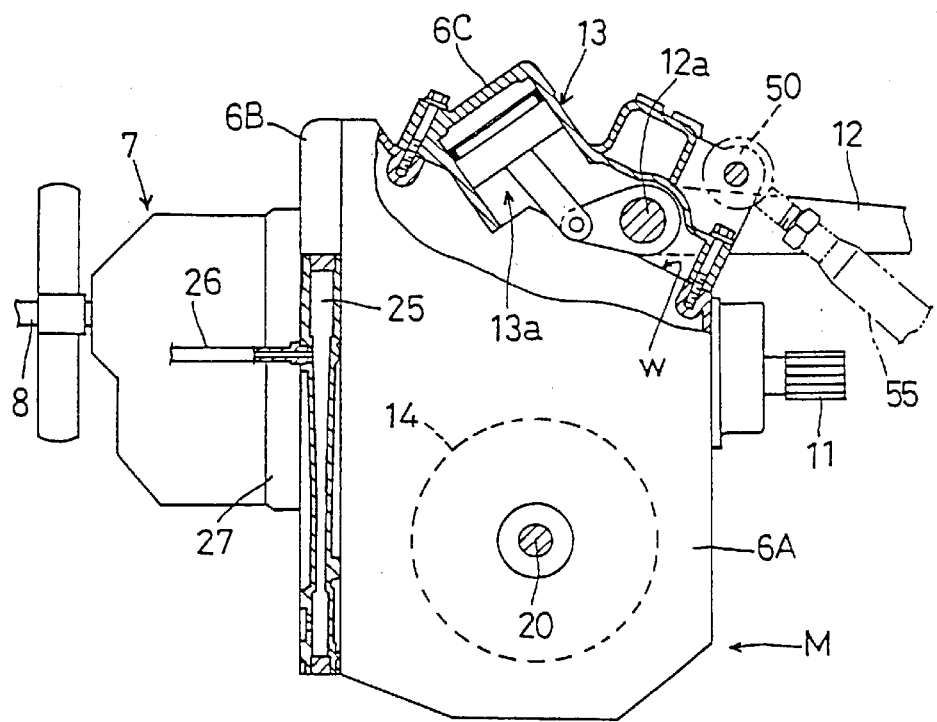
FIG. 8 is a side view, partly in section, of the transmission.

As shown in FIG. 8, HST 7 acting as a propelling drive main change speed mechanism is integrated to the transmission case 6, with an oil passage block 27 supporting the pump 7p and motor 7m and bolted to the front surface of front cover 6B. With the construction described above, the entire transmission M including HST 7 has a forward end thereof disposed as close to the rear axles 20 as possible. Thus, the lawn tractor has a reduced wheelbase while allowing the mower 1 to be raised a sufficient amount.

Figure 9:
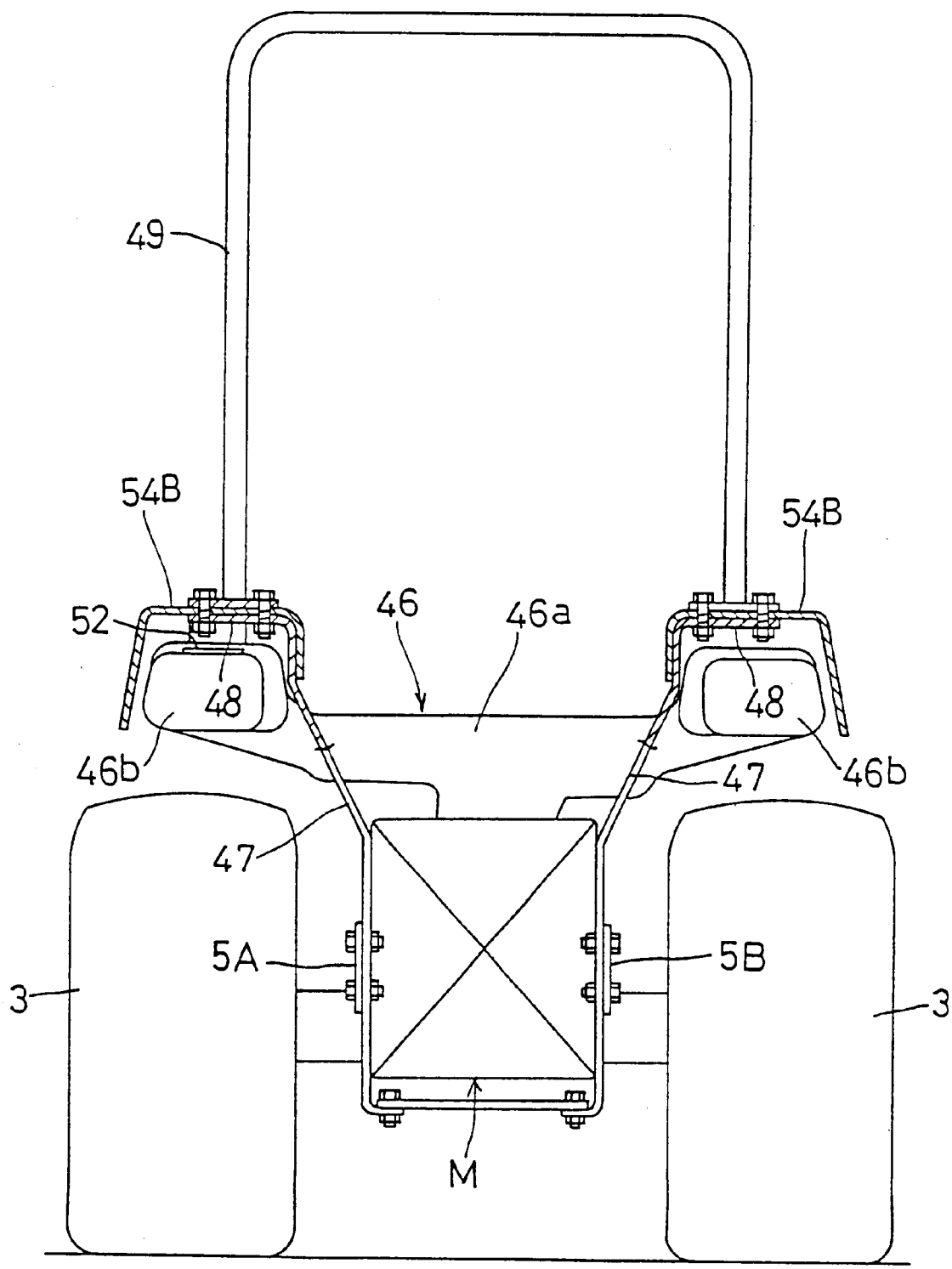
FIG. 9 is a rear view showing a fuel tank and a guard frame.

As shown in FIG. 9, the tractor includes a fuel tank 46 of irregular shape having a middle tank portion 46a disposed over the transmission case 6 and side tank portions 46b arranged over the right and left rear wheels 3 so as to cover the rear wheels 3. These tank portions 46a and 46b are integrated to communicate with one another. Vertical plate posts 47 bolted to the rear ends of the right and left body frames 5A and 5B extend upward along inward surfaces of side tank portions 46b, and are bent outward over the side tank portions 46b to define mounting seats 48.

These right and left mounting seats 48 are used for bolting thereto a guard frame (or rollover protection structure) 49 for protecting the rider. Thus, the guard frame 49 is firmly fixed to the body frames 5A and 5B without interfering with the fuel tank 46.

Figure 12A:
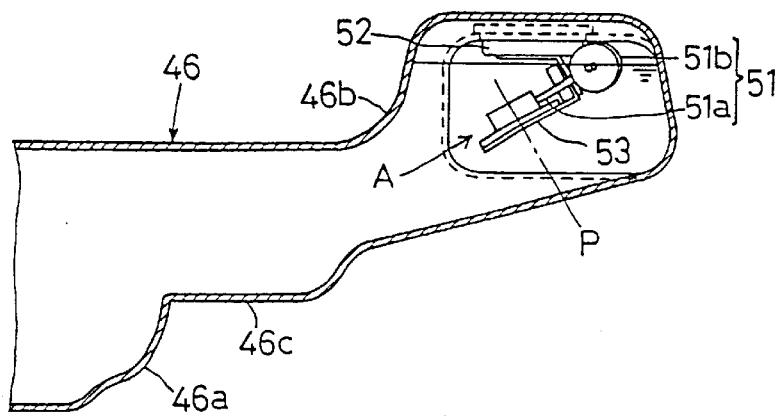
FIG. 12 is a front view of a fuel gauge and a mounting structure therefor.
Figure 12B:
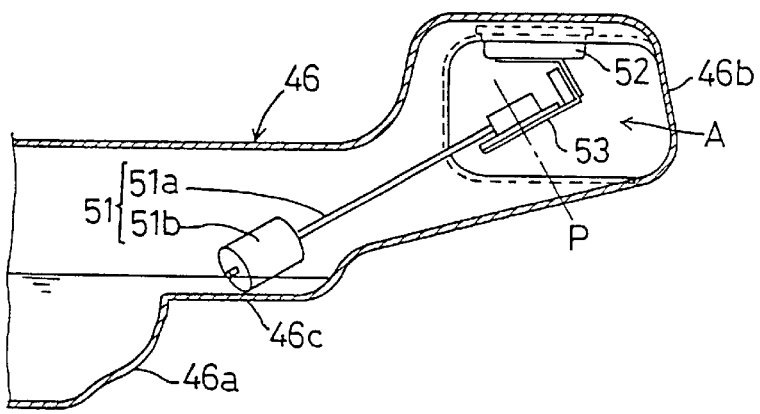
Figure 13:
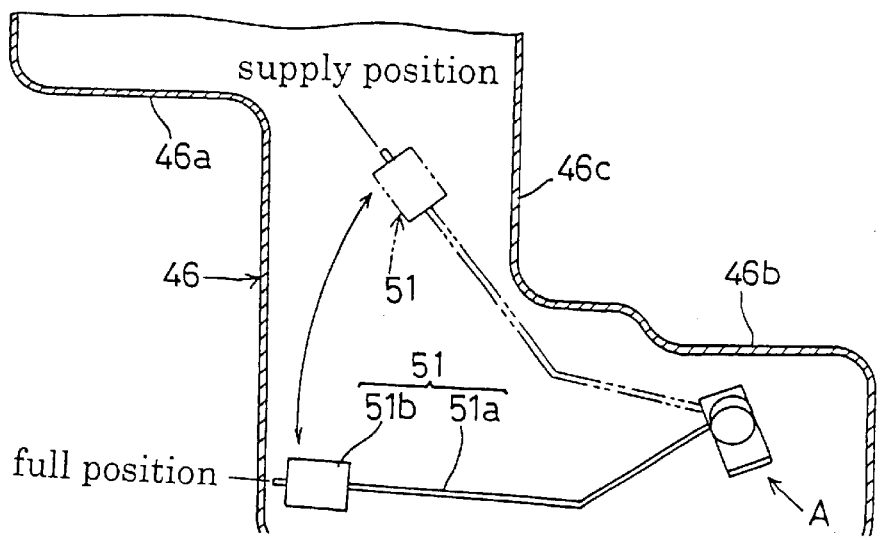
FIG. 13 is a plan view showing movement of a float of the fuel gauge.

As shown in FIGS. 12 and 13, the left side tank portion 46b includes a fuel gauge A. Specifically, a stay 53 is attached to a lower surface of a lid 52 fitted to a circular opening formed in an upper surface of left side tank portion 46b, and a gauge body 51 is attached to the stay 53 to be oscillatable about an inclined axis P. The gauge body 51 includes a rod 51a defining the inclined axis P, and a float 51b attached to a distal end of the rod 51a. The float 51b is obliquely oscillatable between a full tank position at a left forward end in the left side tank portion 46b (FIG. 12(A)) and replenish position at a bottom of a connecting tank portion 46c between the left side tank portion 46b and middle tank portion 46a (FIG. 12(B)).

That is, the float 51b moves to the full tank position with a rise of fuel level when the fuel tank 46 is filled to a maximum, and moves to the replenish position with a fall of fuel level when the fuel tank 46 is nearly empty. Consequently, a residual quantity of fuel may be indicated steplessly by providing a potentiometer (not shown) on the inclined axis P. A device for notifying that the fuel tank 46 should be replenished may be provided in the form of a switch (not shown) operable when the float 51b moves close to the replenish position.

Figure 10:
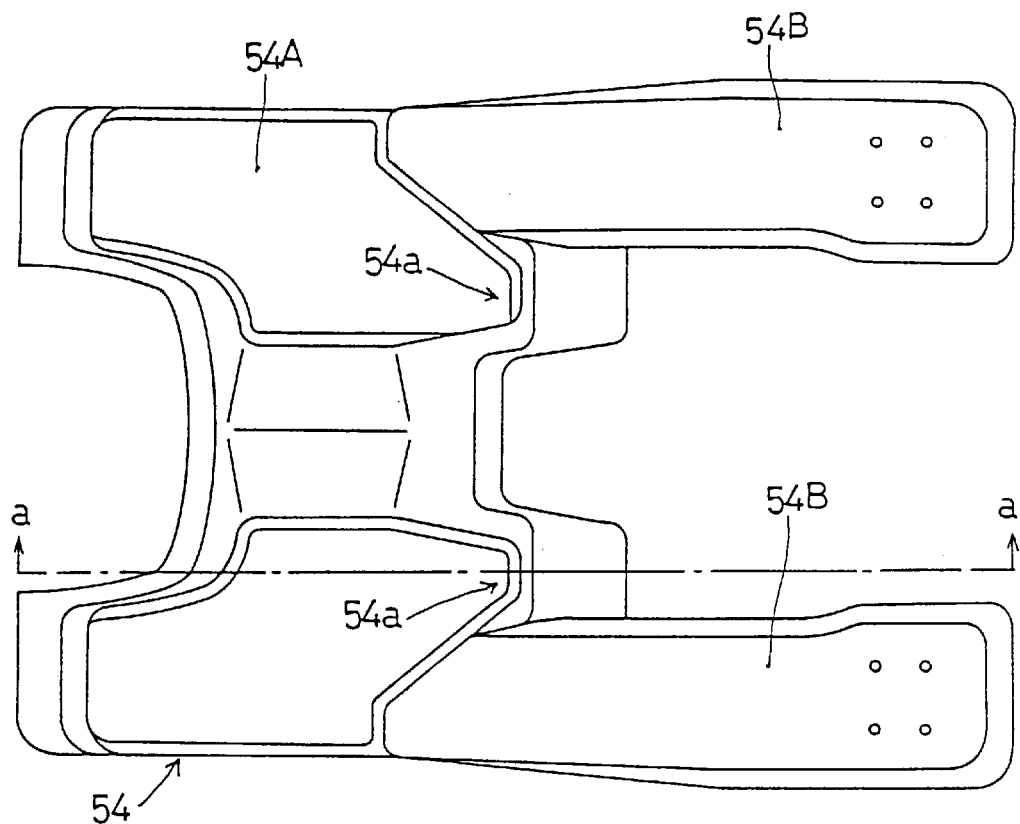
FIG. 10 is a plan view showing foot-rests.
Figure 11:
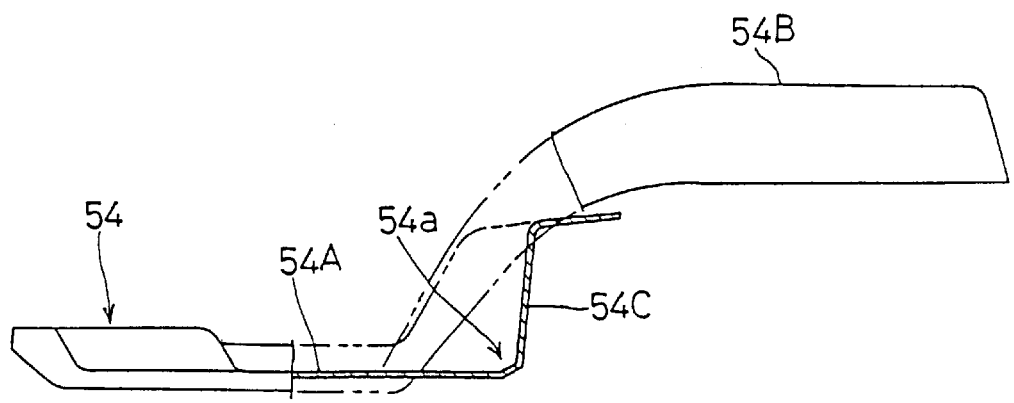
FIG. 11 is a section taken on line a—a of FIG. 10.

As shown in FIGS. 10 and 11, a driving platform B includes a floor 54 having foot-rests 54A, right and left fenders 54B, and a vertical wall 54C integrating and interconnecting the fenders 54B and covering the front of transmission case 6. The foot rests 54A have right and left extensions 54a extending rearward into spaces between the transmission case 6 and right and left rear wheels 3. Thus, extra foot spaces are provided for receiving the heels of the rider.

What is claimed is:

1. A tractor comprising:

front wheels;

an engine disposed adjacent to said front wheels;

rear wheels;

a transmission case disposed adjacent to said rear wheels, said transmission case having right and left lateral walls, and a front surface;

a framework substantially forming a body of said tractor and extending in a fore and aft direction of said tractor, wherein said framework includes a first frame and a second frame, said first frame having its rearward end region connected to said left lateral wall of said transmission case, and said second frame having its rearward end region connected to said right lateral wall of said transmission case;

a hydrostatic stepless transmission (HST) disposed forewardly of said transmission case for receiving power from said engine, said HST including an HST pump and an HST motor;

a propelling change speed gearing mechanism housed in said transmission case for receiving the power from said HST motor;

a power take-off change speed gearing mechanism housed in said transmission case for receiving the power from said HST pump;

a power take-off clutch permitting and breaking the power to be transmitted from said HST pump to said power take-off change speed gearing mechanism; and a rear wheel differential housed in said transmission case, said rear wheel differential including:
- a differential input gear receiving the power from said propelling change speed gearing mechanism;
- a differential input shaft mounting said differential input gear thereon to be rotatable about a first transverse axis;
- a differential output gear receiving the power from said differential input gear and transmitting the power to said rear wheels; and
- a differential output shaft mounting said differential output gear thereon to be rotatable about a second transverse axis;
- said second transverse axis extending vertically below and parallel to said first transverse axis; and
- said differential output gear having a larger diameter than said differential input gear;
- wherein said propelling change speed gearing mechanism and said power take-off change speed gearing mechanism are disposed in a space defined between said front surface of said transmission case and a virtual plane extending vertically through said first transverse axis and second transverse axis and parallel to said front surface, and within a width of said right and left lateral walls of said transmission case; and
- said power take-off clutch is disposed upwardly of said differential input gear.

2. A tractor as defined in claim 1, wherein said power takeoff clutch includes friction plates arranged forwardly of said virtual plane.

3. A tractor as defined in claim 1, wherein said propelling change speed gearing mechanism includes a propelling drive input shaft for receiving the power from said HST motor, a propelling drive change speed shaft, and a shift gear mounted on said change speed shaft to be rotatable relative thereto and engageable with said propelling drive input shaft, said propelling drive input shaft and said propelling drive change speed shaft extending rearwardly of a forward end of said differential input gear.

4. A tractor as defined in claim 1, wherein a distance between said second transverse axis and said front surface in plan view is less than ⅛ of a length each of said first and second frames.

5. A tractor as defined in claim 4, wherein a distance between said second transverse axis of said rear wheel differential and said front surface in plan view is less than 1/10 of a length each of said first and second frames.

6. A tractor as defined in claim 1, wherein said transmission case has a fore and aft length which is at most ¼ of a length each of said first and second frames.

7. A tractor as defined in claim 6, wherein said transmission case has a fore and aft length which is at most ⅕ of a length each of said first and second frames.

8. A tractor as defined in claim 1, wherein said transmission case has a fore and aft length which is at most 1/3.5 of a fore and aft distance between said axis of said rear wheel axles and an axis of front wheel axles.

9. A tractor as defined in claim 8, where said transmission case has a fore and aft length which is at most ¼ of a fore and aft distance between said axis of said rear wheel axles and an axis of front wheel axles.

10. A tractor as defined in claim 1, wherein said transmission case has a fore and aft length which is at most 1.2 times a transverse width of said transmission case.

11. A tractor as defined in claim 1, wherein said transmission case includes a main case for housing said propelling change speed gearing mechanism, said power take-off change speed gearing mechanism, said rear wheel differential and said power takeoff clutch, and a front cover defining said front surface.

12. A tractor as defined in claim 11, wherein said main case is formed integrally.

13. A tractor as defined in claim 11, wherein said front cover has an oil filter disposed on a lower portion thereof, and supply and drain oil passages which are through holes formed in said front cover to extend parallel to said front surface.

14. A tractor as defined in claim 1, wherein said power takeoff clutch is mounted on a power takeoff input shaft receiving the power from said HST pump, said power takeoff input shaft having a rear end terminated at said virtual plane.

15. A tractor as defined in claim 1, wherein said second transverse axis extends coaxial with a rotational axis each of said rear wheels.

* * * * *